Patented Oct. 8, 1935

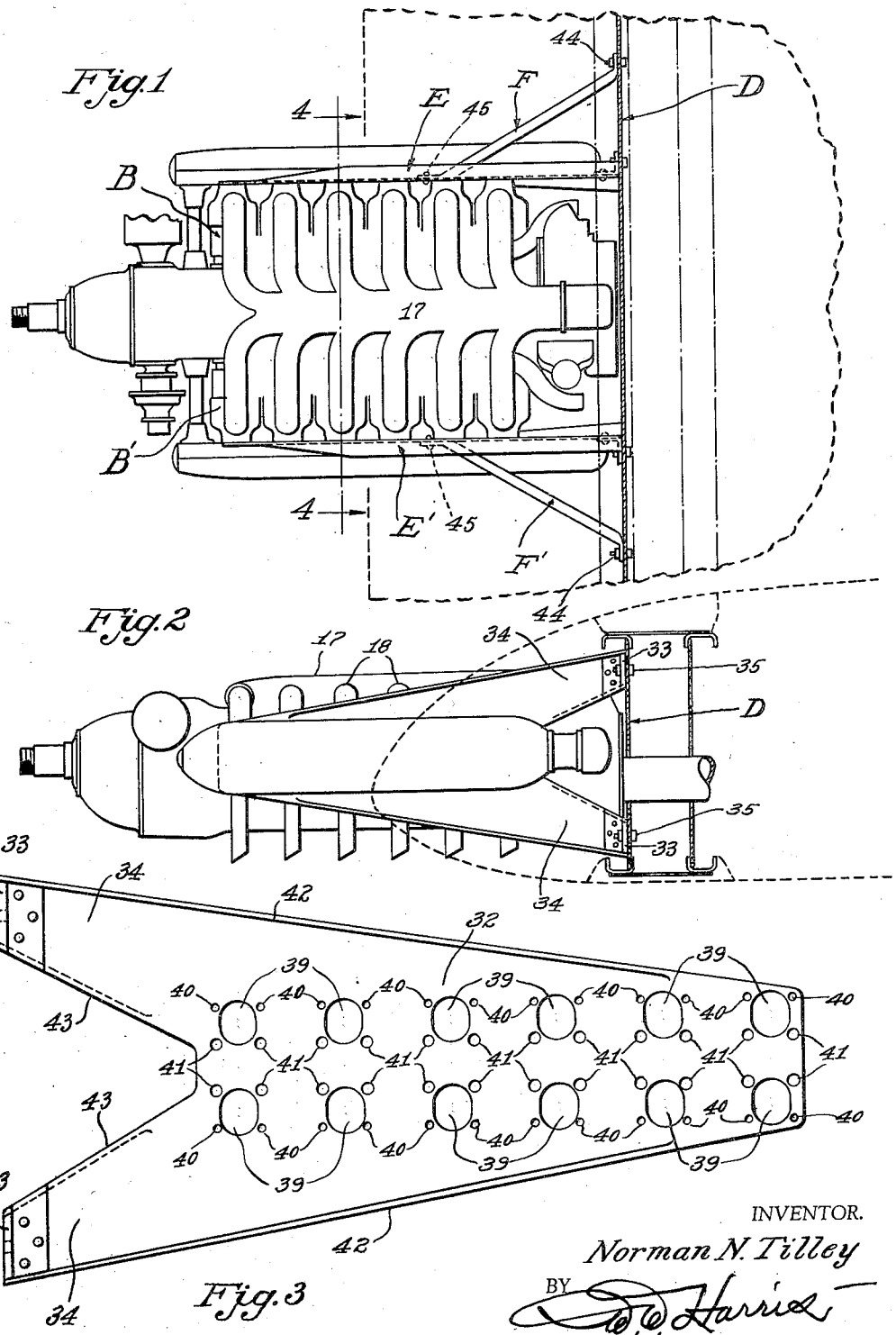

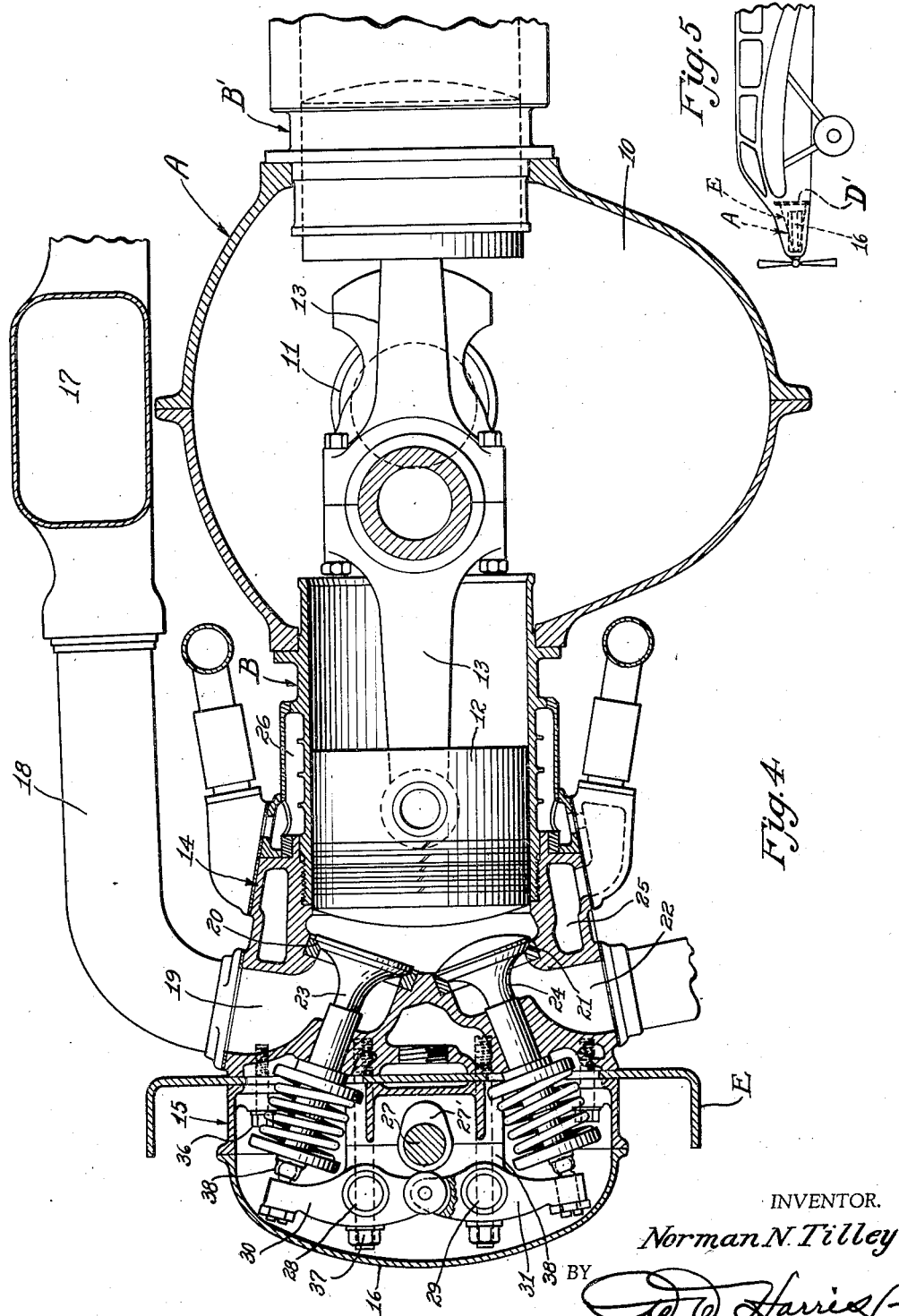

2,016,693

UNITED STATES PATENT OFFICE 2,016,693

ENGINE SUPPORT

Norman N. Tilley, Detroit, Mich., assignor to Continental Motors Corporation, Detroit, Mich., a corporation of Virginia Application October 2, 1933, Serial No. 691,740

12 Claims. (Cl. 248—5)

My invention is related to engine supports and more particularly to that type of engine supports arranged for securing an internal combustion engine of the aircraft type to a suitable airplane structure such as the longitudinally extending spar of the wing structure or the forward bulkhead or partition of the fuselage, said engine being thereby supported so as to extend generally forwardly of the airplane structure in the usual manner. More particularly, the engine supporting structure hereinafter described is one which is especially suited for supporting an internal combustion engine of the type having aligned cylinders, and particularly one which is provided with a pair of substantially horizontally opposed banks of aligned cylinders as shown in the illustrated embodiment of my invention.

In many instances it is desirable to carry the engine on the wing structure of an airplane, and the present invention is particularly suited to that type of installation as well as being adaptable in connection with an engine which is to be supported from a suitable bulkhead carried in the fuselage of the airplane.

An object of my present invention is to therefore provide a rigid and simple engine support for supporting an internal combustion engine of the aircraft type from a suitable portion of the airplane structure.

More particularly it is an object of my invention to provide an engine support for supporting the engine from the airplane structure, which is especially adapted for supporting an engine of the type having aligned cylinders, and more particularly one having cylinders which are arranged in a pair of substantially horizontally opposed banks of aligned cylinders.

A further important object of my present invention is to provide an improved engine support for supporting an internal combustion engine from an airplane structure by providing supporting members which are secured to the cylinder head structure of the engine and extended rearwardly thereof for attachment to the airplane structure.

A still further object of my present invention is to provide an improved engine support consisting of engine supporting members secured to the cylinder head structure of an engine of the character described having a particular cylinder head construction including cooperating separate cylinder head portions that are adapted to be secured together and to the engine block, the supporting members being rigidly clamped between said cylinder head portions and having an extension extending rearwardly of the engine for attachment to the airplane structure.

Still further objects of my invention pertain to various structural characteristics of the engine support, and in the manner in which the engine support is fastened to the engine structure and to the airplane structure, these specific details of construction having particular significance in connection with the device of the character as shown in the particular embodiment of my invention.

For a more detailed understanding of my invention, reference may be had to the accompanying drawings which illustrate one form which my invention may assume, and in which:

Fig. 1 is a plan view of an aircraft internal combustion engine illustrating my improved engine support assembled therewith and attached to a portion of the airplane structure, said airplane structure being illustrated partly in section and somewhat diagrammatically, Fig. 2 is a side elevational view of the engine and associated engine supports as illustrated in Fig. 1, but showing the associated portion of the airplane structure in section, Fig. 3 is a plan detail view of one of the supporting members when disassembled from the engine structure.

Fig. 4 is a transverse sectional view through the engine structure showing the engine supporting members in cross-section and particularly illustrating the manner in which said engine supporting members are secured to the cylinder head structure of said engine, and Fig. 5 is a small detail view diagrammatically illustrating the assembly of an engine to a suitable airplane structure portion carried by the airplane fuselage.

Although I find that the principles of my invention may be incorporated with engines other than that of the type shown in the illustrated embodiment of my invention, as will be readily apparent from the following description, it will be obviously understood that the particular aspects of my invention are of particular significance in connection with an engine of the type having a pair of substantially horizontally opposed aligned cylinders, and which is adapted to be supported from a suitable portion of the airplane structure in such a way as to extend forwardly from said airplane structure. I have chosen for purposes of illustration to show my invention incorporated with an engine structure A which in general includes a crankcase 10, and a pair of substantially horizontally opposed banks of cylinders respectively designated by the reference characters B and B'. The engine includes the usual crankshaft 11 connected with pistons 12 reciprocating in the cylinders by means of the connecting rods 13.

The engine structure will be seen to thus provide a pair of banks of aligned cylinders which lie in substantially opposed relation with respect to each other. I have provided a cylinder head structure which is adapted to be secured to each bank of aligned cylinders, each cylinder head structure preferably comprising a pair of co-operating separate cylinder head portions respectively designated by reference characters 14 and 15, a suitable cover or other housing 16 being adapted to be secured to the cylinder head portion 15 for enclosing and housing the rocker arm structure. It will be noted that the intake manifold consists in general of a fuel mixture distributing portion or runner 17 extending longitudinally of the engine and provided with a plurality of spaced port runners 18 for connecting said lateral runner 17 with the intake passages 19 of the engine, these intake passages being preferably provided in the cylinder head portion 14 which also carries the intake and exhaust ports opening into the engine cylinder, said intake and exhaust ports being numbered 20 and 21 respectively and respectively communicating with the intake and exhaust passages 19 and 22. I have provided intake and exhaust valves 23 and 24 respectively which are supported by the cylinder head portion 14 and arranged to open inwardly of the cylinder and substantially toward the piston face. The cylinder head portion 14 is preferably jacketed as at 25 for the circulation of a cooling medium therethrough, this jacket portion 25 being suitably connected with the cylinder jacket 26, the cooling medium being introduced into the cylinder and cylinder head jacket from the fixture or other suitable connection connected with a source of cooling medium supply. The valves 23 and 24 which are supported by the cylinder head portion 14 are arranged to extend within the cylinder head portion 15, this latter cylinder head portion being provided with suitable bearings for supporting camshaft 27 and the intake and exhaust rocker arm supports 28 and 29 respectively. The rocker arms 30 and 31 are respectively associated with the intake and exhaust valves 23 and 24. The operation of the engine described and illustrated has no particular significance with respect to the present invention, and therefore, the particular operation of the engine is not described herein in detail. The construction and arrangement of the engine, and in particular the construction and arrangement of the cylinder head structure, the location and positioning of the valves and valve actuating mechanism is only of particular significance insofar as their positions necessitate a particular construction with which my improved engine supporting device is adapted to be assembled therewith.

I have provided an improved engine supporting device which is particularly adapted for supporting an engine of the character described from a suitable rigid portion of the airplane structure. As shown in Figs. 1 and 2 it will be seen that the engine is supported from the longitudinally extending spar or other suitable rigid portion of the airplane wink structure, this spar being generally referred to in the specification and claims as a portion of the airplane structure, and in this instance is designated by the reference character D. In Fig. 5 I have diagrammatically illustrated the engine as being supported from a bulkhead D' carried in the fuselage of the airplane structure, and reference in the claims of an airplane structure will obviously include either the bulkhead of the fuselage as illustrated in Fig. 5, or the longitudinal spar carried in the wing structure as illustrated in Figs. 1 and 2.

The supporting members which are fastened to the engine and which are provided with portions which extend rearwardly of the engine for attachment to the airplane structure are designated as a whole by the reference characters E and E', these supporting members or plates being clearly illustrated in Figs. 3 and 4, the former figure showing a detail of the said supporting member or plate. Each of these supporting members consists generally of a plate structure which includes a body portion 32 adapted to be secured to the engine cylinder head structure, and the foot portions 33 which are carried by the extensions 34, these extensions being arranged to extend rearwardly of the engine and the foot portions being arranged to lie substantially flush against a portion of the airplane structure, and as illustrated in Figs. 1 and 2 these foot portions lie flush against the face of the longitudinally extending spar carried by the airplane wing and are secured thereto by means of suitable bolts or other fastening devices broadly designated by the reference character 35.

The body portion of the supporting members or plates is as stated above secured to the cylinder head structure, and preferably these supporting plates are clamped between the two cooperating cylinder head portions 14 and 15. The bolts or other suitable fastening means 36 are arranged to secure the cylinder head portions 15 and 14 together and the bolts or other suitable fastening means 37 are arranged to secure the bearing blocks 38 to the cylinder head portion 15 as well as to secure said cylinder head portions together. Any suitable means may be employed for securing the cylinder head structure to the cylinders. It will be noted that the camshaft 27 is provided with suitable cams 27' for actuating the rocker arms and valves 23 and 24 respectively, the camshaft extending substantially longitudinally of the engine and driven from the engine crank shaft by any suitable driving connection.

It will be noted that the supporting members or plates E and E' substantially overlie the aligned cylinders, and are further provided with suitable openings 39 through which the valves 23 and 24 may extend, the supporting members being also provided with suitable holes 40 and 41 respectively accommodating the bolts or other fastening devices 36 and 37.

The outer edges of the supporting members or plates are preferably flanged as at 42 (see Fig. 3) in order to reinforce these supporting members and resist the forces which would tend to bend or otherwise distort the said supporting members. The foot carrying extensions 34 may be suitably reinforced in any desired manner, and preferably said extensions are provided with flanges 43 which cooperate with the flanges 42 for providing a rigid strut or support in order to firmly support the engine from the airplane structure.

If found desirable other braces or supporting members may be provided for providing an additional support which will tie the engine with the airplane structure. In Fig. 1 I have illustrated said additional braces as comprising the struts or bracket members F and F' respectively, these braces being bolted to the airplane structure as at 44 and suitably secured or fastened to the engine structure as at 45. Obviously in some installations it will be found that the braces F and F' may be omitted, though in general it will be found that such additional braces are desirable in order to lessen engine vibration and to more firmly support the engine from said airplane structure.

I find that the supporting members as described above provide a firm support for the engine and by reason of their connection with the cylinder head structure, I find that they are especially suited for supporting an engine of the character described which is provided with a pair of substantially opposed aligned cylinders, the engine being thereby supported substantially between these spaced engine supports and firmly supported against the tendency of said engine of being moved or otherwise displaced laterally with respect to the airplane structure from which said engine is supported. I have provided a very simple engine support which can be very readily and quickly assembled whereby to facilitate the engine assembly with an airplane structure, and furthermore, it will be noted that the engine support as heretofore described is applicable for connection with various portions of the airplane structure thereby facilitating the mounting of the engine in the airplane wing structure or with the airplane fuselage, depending upon whether one or more engines is to be employed as the motive power for the airplane.

It will be apparent to those skilled in the art to which my invention pertains, that various modifications and changes may be made therein without departing from the spirit of my invention or from the scope of the appended claims.

What I claim as my invention is:

1. A multi-cylinder engine support for attachment to an airplane structure including a plate attached at one end to the airplane structure, the main body portion of said plate overlying a plurality of aligned engine cylinders and secured intermediate adjacent portions of the engine structure, said engine having valving mechanism including valves which extend through said plate member.

2. In a device of the character described for supporting a multi-cylinder in line engine from an airplane structure, said device including a plate member having an extension extending rearwardly from the engine and attached to a portion of the airplane structure, said engine including a cylinder head structure overlying a plurality of aligned engine cylinders, said plate member including a body portion secured to said cylinder head structure.

3. In a device of the character described for supporting a multi-cylinder in line engine from an airplane structure, said device including a plate member having an extension extending rearwardly from the engine and attached to a portion of the airplane structure, said engine including a cylinder head structure having cooperating separate cylinder head portions secured together and closing the outer open ends of the cylinders, said plate member including a body portion secured intermediate said cooperating cylinder head portions.

4. In a device of the character described for supporting a multi-cylinder in line engine from an airplane structure, said device including a plate member having an extension extending rearwardly from the engine and attached to a portion of the airplane structure, said engine including a cylinder head structure having cooperating separate cylinder head portions secured together and closing the outer open ends of the cylinders, said plate member including a body portion secured intermediate said cooperating cylinder head portions, and fastening means extending through said plate member for securing said cylinder head portions together.

5. In a device of the character described for supporting a multi-cylinder in line engine from an airplane structure, said device including a plate member having an extension extending rearwardly from the engine and attached to a portion of the airplane structure, said engine including a cylinder head structure having cooperating separate cylinder head portions secured together and closing the outer open ends of the cylinders, said plate member including a body portion secured intermediate said cooperating cylinder head portions, valving mechanism supported by said cylinder head portions and including valve devices, said plate member having openings through which said valve devices project.

6. In a device of the character described for supporting a multi-cylinder in line engine from an airplane structure, said device including a plate member having an extension extending rearwardly from the engine and attached to a portion of the airplane structure, said engine including a cylinder head structure overlying a plurality of aligned engine cylinders, said plate member including a body portion secured to said cylinder head structure, and other strut members secured at one end to the cylinder head structure and at the other end to the airplane structure.

7. In a device of the character described for supporting a multi-cylinder engine having a plurality of substantially opposed banks of aligned cylinders from an airplane structure, said engine including a cylinder head structure associated with each bank of cylinders, said device including a pair of supporting members anchored at one end to the airplane structure and each having a body portion secured to one of said cylinder head structures.

8. In a device of the character described for supporting a multi-cylinder engine having a plurality of substantially opposed banks of aligned cylinders from an airplane structure, said engine including a cylinder head structure associated with each bank of cylinders, said device including a pair of plate members each having a body portion secured to one of said cylinders head structures and each having an extension extending rearwardy of the engine for attachment to the airplane structure.

9. In a device of the character described for supporting a multi-cylinder engine having a plurality of substantially opposed banks of aligned cylinders from an airplane structure, said engine including a cylinder head structure associated with each bank of cylinders, said device including a pair of plate members each having a body portion secured to one of said cylinder head structures and each having an extension extending rearwardly of the engine, said extensions terminating in oppositely extending foot portions extending substantially flush against a portion of the airplane structure, and means for fastening said foot portions to said airplane structure.

10. In a device of the character described for supporting a multi-cylinder aircraft engine from an airplane structure, said engine having a pair of substantially opposed banks of aligned cylinders, a cylinder head structure secured to each bank of aligned cylinders and including cooperating separate cylinder head portions secured to each other, and supporting members clamped between said cylinder head portions, said members extending rearwardly of the engine and attached to said airplane structure, the engine being thereby supported substantially between said supporting members.

11. In a device of the character described for supporting a multi-cylinder aircraft engine from an airplane structure, said engine having a pair of substantially opposed banks of aligned cylinders, a cylinder head structure secured to each bank of aligned cylinders and including cooperating separate cylinder head portions secured to each other, and supporting members clamped between said cylinder head portions, said members extending rearwardly of the engine and attached to said airplane structure, the engine being thereby supported substantially between said supporting members, valve means supported by one of said cylinder head portions and extending into said other cylinder head portion, said supporting member having openings through which said valve means extend.

12. In a device of the character described for supporting a multi-cylinder aircraft engine from an airplane structure, said engine having a pair of substantially opposed banks of aligned cylinders, a cylinder head structure secured to each bank of aligned cylinders and including cooperating separate cylinder head portions secured to each other, and supporting members clamped between said cylinder head portions, said members extending rearwardly of the engine and attached to said airplane structure, the engine being thereby supported substantially between said supporting members, the rearwardly extending portions of said supporting members having flanges extending transverse to the plane of the supporting members whereby to reinforce same and resist lateral forces tending to bend the supporting members.

NORMAN N. TILLEY.